United States Patent
Shiba et al.

[11] Patent Number: 6,127,072
[45] Date of Patent: Oct. 3, 2000

[54] PRODUCTION OF COLOR FILTER BY FORMING LIGHT-SCREENING LAYER AND IRRADIATING RESIN LAYER TO ACHIEVE INK-ACCEPTING PROPERTY

[75] Inventors: Shoji Shiba, Sagamihara; Hideaki Takao, Machida; Ryuichi Yokoyama, Yokohama; Akio Kashiwazaki, Yokohama; Masashi Sobue, Yokohama; Takeshi Okada, Kawasaki, all of Japan

[73] Assignee: Canon Kabushiki Kaisha, Tokyo, Japan

[21] Appl. No.: 09/087,767

[22] Filed: Jun. 1, 1998

[30] Foreign Application Priority Data

Jun. 2, 1997 [JP] Japan .................................. 9-142844

[51] Int. Cl.⁷ ............................ G02B 5/20; G02F 1/1335
[52] U.S. Cl. ................................................ 430/7; 349/106
[58] Field of Search ................................ 430/7; 349/106; 347/106

[56] References Cited

U.S. PATENT DOCUMENTS

| | | | |
|---|---|---|---|
| 4,712,874 | 12/1987 | Sekimura et al. | 350/339 F |
| 4,786,148 | 11/1988 | Sekimura et al. | 350/339 F |
| 4,793,692 | 12/1988 | Kamio et al. | 350/311 |
| 4,802,743 | 2/1989 | Takao et al. | 350/339 F |
| 4,818,075 | 4/1989 | Takao et al. | 350/339 F |
| 4,839,399 | 6/1989 | Sato et al. | 522/14 |
| 4,917,471 | 4/1990 | Takao et al. | 350/339 F |
| 5,078,475 | 1/1992 | Sekimura et al. | 359/68 |
| 5,101,289 | 3/1992 | Takao et al. | 359/68 |
| 5,212,575 | 5/1993 | Kojima et al. | 359/82 |
| 5,320,883 | 6/1994 | Asaoka et al. | 428/1 |
| 5,326,600 | 7/1994 | Asaoka et al. | 428/1 |
| 5,330,803 | 7/1994 | Takao et al. | 428/1 |
| 5,381,256 | 1/1995 | Hanyu et al. | 359/75 |
| 5,391,442 | 2/1995 | Tsushima | 430/7 |
| 5,398,126 | 3/1995 | Takao et al. | 359/68 |
| 5,419,931 | 5/1995 | Asaoka et al. | 428/1 |
| 5,419,932 | 5/1995 | Togano et al. | 428/1 |
| 5,552,192 | 9/1996 | Kashiwazaki et al. | 427/492 |
| 5,552,193 | 9/1996 | Asaoka et al. | 428/1 |
| 5,576,864 | 11/1996 | Takao et al. | 359/76 |
| 5,587,211 | 12/1996 | Togano et al. | 428/1 |
| 5,650,867 | 7/1997 | Kojima et al. | 359/104 |
| 5,681,675 | 10/1997 | Kurauchi et al. | 430/7 |
| 5,712,064 | 1/1998 | Miyazaki et al. | 430/7 |
| 5,716,739 | 2/1998 | Kashiwazaki et al. | 430/7 |
| 5,716,740 | 2/1998 | Shiba et al. | 430/7 |
| 5,721,077 | 2/1998 | Takao et al. | 430/7 |
| 5,721,089 | 2/1998 | Takao et al. | 430/283.1 |
| 5,726,724 | 3/1998 | Shirota et al. | 349/106 |
| 5,734,456 | 3/1998 | Takao et al. | 349/106 |

FOREIGN PATENT DOCUMENTS

| | | |
|---|---|---|
| 59-075205 | 4/1984 | Japan . |
| 61-245106 | 10/1986 | Japan . |
| 63-066501 | 3/1988 | Japan . |
| 63-235901 | 9/1988 | Japan . |
| 1-217302 | 8/1989 | Japan . |
| 1-217320 | 8/1989 | Japan . |
| 7-035916 | 2/1995 | Japan . |
| 9-015580 | 1/1997 | Japan . |

*Primary Examiner*—John A. McPherson
*Attorney, Agent, or Firm*—Fitzpatrick, Cella, Harper & Scinto

[57] ABSTRACT

Disclosed herein is a process for producing a color filter substrate, which comprises the steps of forming a resin layer for coloration, which develops an ink-accepting property by irradiation of light, on a base; forming a light-screening layer on the resin layer for coloration; exposing the resin layer for coloration through the light-screening layer as a mask; and applying color inks to the resin layer for coloration.

9 Claims, 2 Drawing Sheets

PRODUCTION OF COLOR FILTER BY FORMING LIGHT-SCREENING LAYER AND IRRADIATING RESIN LAYER TO ACHIEVE INK-ACCEPTING PROPERTY

BACKGROUND OF THE INVENTION

1. Field of the Invention

The present invention relates to a process for the preparation of a color filter substrate suitable for use in color liquid crystal display devices.

2. Related Background Art

With the advancement of personal computers, particularly, portable personal computers in recent years, the demand for liquid crystal display devices, particularly, color liquid crystal display devices tends to increase. It is however necessary to reduce the cost of the color liquid crystal display devices for further spreading them. There is an increasing demand for reduction in the cost of color filters particularly given much weight from the viewpoint of the cost.

Various processes have heretofore been attempted for meeting the above demand while satisfying properties required of the color filters. However, no process satisfying all the required properties is yet established under the circumstances. The typical production processes of color filters will hereinafter be described.

The first method is a pigment dispersing process. In this process, a layer of a photosensitive resin, in which a pigment has been dispersed, is first formed on a base and then subjected to patterning, thereby obtaining a pattern of a single color. This process is repeatedly performed three times, thereby forming a color filter composed of colored patterns of R (red), G (green) and B (blue).

The second method is a dyeing process. In the dyeing process, a water-soluble polymeric material, which is a material to be dyed, is applied to a base, and the coating film thus formed is patterned in the desired form by a photolithographic process. Thereafter, the base on which the coating film has been patterned is immersed in a dye bath to obtain a colored pattern. This process is repeatedly performed three times to form a color filter composed of colored patterns of R, G and B.

As the third method, there is an electrodepostion process. In this process, a transparent electrode is first patterned on a base. The base is then immersed in an electrodeposition coating fluid containing a pigment, a resin, an electrolytic solution and the like to electrically deposit the first color. This process is repeatedly performed three times, thereby forming a color filter layer composed of colored patterns of R, G and B. Finally, this color filter layer is calcined to form a color filter.

The fourth method is a process in which pigments are separately dispersed in a thermosetting resin, the resultant thermosetting resin dispersions of R, G and B colors are separately applied to a base by repeating printing three times, and the resin portions thus applied are then thermoset to form a layer composed of colored patterns of R, G and B, thereby forming a color filter.

It is general to form a protective layer on the colored layer in each process.

The need of repeating the same process three times to form the colored patterns of R, G and B is common to these processes. Therefore, the production cost is necessarily increased. There is also offered a problem that a yield is reduced as the number of processes increases. Besides, in the electrodeposition process, formable patterns are limited. It is hence difficult to apply this process to a TFT color liquid crystal display device in the existing technique. Further, the printing process involves a drawback that resolution is poor, and is hence unfit to form fine-pitch patterns.

In order to eliminate these drawbacks, processes for producing a color filter by using an ink-jet system have been proposed in Japanese Patent Application Laid-Open Nos. 59-75205, 63-235901, 1-217320, etc. However, these processes using the ink-jet system are yet insufficient.

In particular, the following problems arise upon the production of a color filter according to the ink-jet printing system.

(1) Color mixing at boundaries between adjacent pixels of different colors; and (2) Blank areas occurred at boundaries between colored portions and black matrices, and color irregularity caused by the distribution of optical density in colored pixels.

A method for preventing the color mixing at boundaries between adjacent pixels in a color filter has been proposed in Japanese Patent Application Laid-Open No. 4-123005. This method is a method in which a pattern of silicone rubber having high water and oil repellency is formed on black matrices to prevent color mixing in an ink-jet method or printing method. However, this method requires two coating steps, since the pattern of the silicone rubber is formed on a photosensitive resin layer, and the silicone rubber layer or the silicone rubber layer and the photosensitive resin layer are then removed by photolithography, and is hence disadvantageous from the viewpoint of production process.

Therefore, a process for more simply obtaining black matrices having high water and oil repellency at their surfaces has been proposed in Japanese Patent Application Laid-Open No. 7-35916. This process comprises the steps of forming a light-transmissive photosensitive resin layer containing fine silicone particles on a member for forming black matrices, patterning the photosensitive resin layer by photolithography and then processing the member for forming black matrices using the patterned photosensitive resin layer as a mask.

However, since the silicone is contained in a state of fine particles in the thermoplastic resin, this proposal involves the following problems:

(1) the fine silicone particles are left as a residue after development and transferred to the member for forming black matrices, and so defects are caused in the resulting black matrices; and (2) since the resolution of the photosensitive resin is deteriorated if the amount of the fine-silicone particles added is increased, this process is unfit to form fine-pitch patterns.

As a method for preventing bleeding between pixels using a photosensitive silicone, Japanese Patent Application Laid-Open No. 63-66501 describes a process in which matrices are formed with a photosensitive resin, the top areas thereof are colored black by printing to form black matrices, and a protective film is then formed on the black matrices with the photosensitive silicone. An object of this process is to define boundaries between the black matrices and pixels provided at apertures defined by the black matrices to prevent the occurrence of bleeding between the pixels, thereby producing a color filter with high contrast. However, this process involves a problem that since even edge parts of the black matrices formed with the photosensitive resin are covered with the photosensitive silicone, blank areas occur at boundaries between the colored portions (pixels) and the black matrices.

SUMMARY OF THE INVENTION

It is therefore an object of the present invention to provide a production process of a color filter substrate, which satisfies necessary properties such as heat resistance, solvent resistance and resolution, and permits the shortening of production steps to produce the color filter substrate at a low cost, and a color filter substrate with high reliability produced by this process, and particularly to provide a production process of a color filter substrate, which satisfies ink-jet recordability upon formation of a color filter by an ink-jet printing system and permits the provision of a color filter substrate with high reliability in that color mixing and color irregularity are prevented upon application of inks, and a liquid crystal display device excellent in color display characteristics using such a color filter substrate at a low cost.

The above object can be achieved by the present invention described below.

According to the present invention, there is thus provided a process for producing a color filter substrate, which comprises the steps of forming a resin layer for coloration, which develops an ink-accepting property by irradiation of light, on a base; forming a light-screening layer on the resin layer for coloration; exposing the resin layer for coloration through the light-screening layer as a mask; and applying color inks to the resin layer for coloration.

According to the present invention, there is also provided a liquid crystal display device comprising the color filter substrate produced by the production process described above, an opposite substrate provided in an opposing relation with the color filter substrate, and a liquid crystal enclosed in a space between the color filter substrate and the opposite substrate.

DESCRIPTION OF THE PREFERRED EMBODIMENTS

Figure 1A:
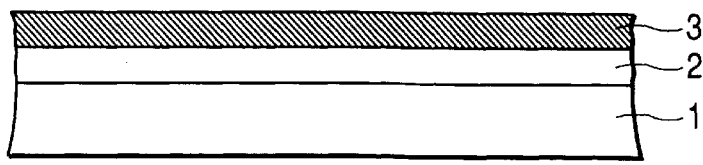
FIGS. 1A, 1B, 1C, 1D and 1E are schematic cross-sectional views illustrating an example of respective steps of a process for the preparation of a color filter substrate according to the present invention.
Figure 1B:
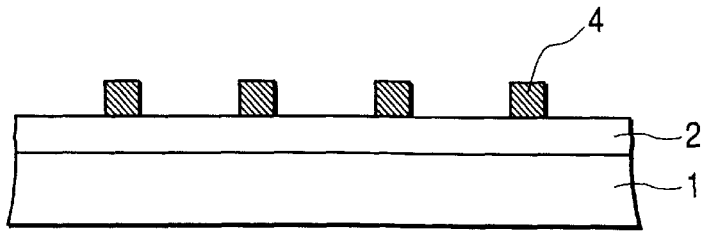
Figure 1C:
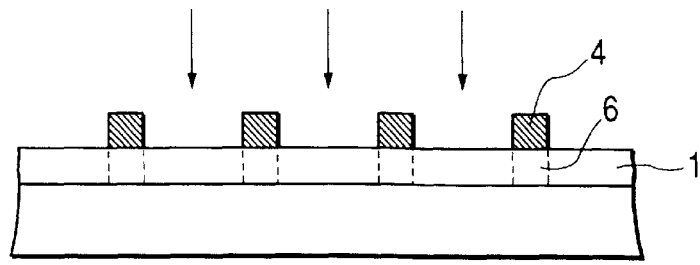
Figure 1D:
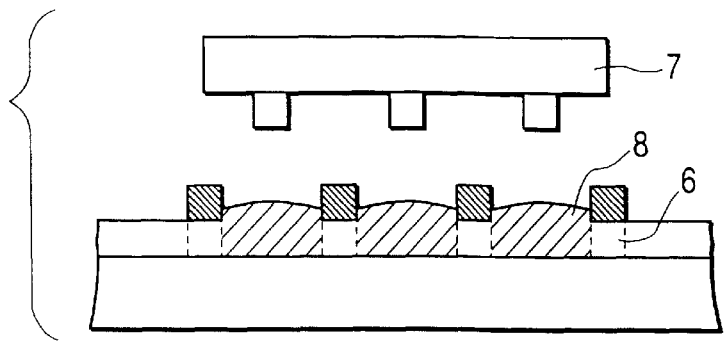
Figure 1E:
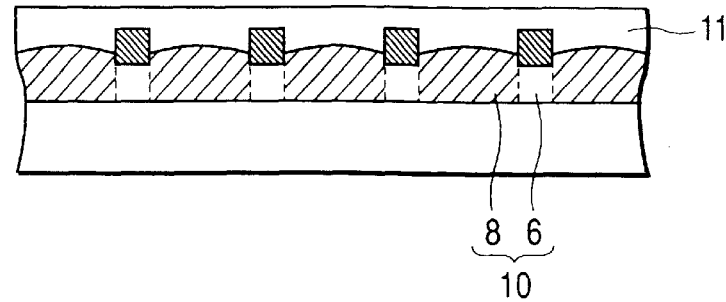

FIGS. 1A, 1B, 1C, 1D and 1E illustrate the production process of a color filter substrate according to an embodiment of the present invention. Wherein, FIGS. 1A to 1E correspond to the following steps (a) to (e), respectively.

Step (a):

A resin layer 2 for coloration and a black resin layer 3 as a light-screening layer are first formed on a transparent base 1.

In the present invention, a glass base is generally used as the transparent base 1. However, the base is not limited to the glass base so far as it has properties required of the color filter substrate, such as transparency and mechanical strength.

In order to absorb color inks to be applied in Step (d), which will be described subsequently, and prevent color mixing between adjacent filter elements (pixels), the resin layer 2 for coloration is formed with a resin composition which has no ink-accepting property when used as it is, but develops an ink-accepting property by exposure which will be described subsequently. As such a resin, may preferably be used a silicone resin having a disilane structure in its molecule. Specifically, there may be preferably used solvent-soluble organopolysilane such as poly (phenylmethyl)silane, reaction products of bissilylamine having a disilane structure and a bisphenol-type compound, reaction products of a diamine having a disilane structure and a carboxylic acid dianhydride, and (disilanylene) phenylene polymers obtained by the condensation reaction of 1,4-bis(chlorosilyl)benzene and the like. A solvent used in applying these resins is preferably a non-polar solvent, for example, toluene, xylene or methyl isobutyl ketone.

An electron-transferring additive such as phthalimide triflate may be added to the resin composition for coloration for the purpose of enhancing the sensitivity of the resin composition to light upon exposure which will be described subsequently. No particular limitation is imposed on the coating method for the formation of the resin layer 2 for coloration, and a coating method such as spin coating, roll-coating, bar coating, spray coating or dip coating may be used. The thickness of the resin layer 2 for coloration is preferably within a range of from 0.1 to 5 µm.

The black resin layer 3 is provided for the purpose of forming patterned black matrices 4 on the resin layer 2 for coloration. The black matrix pattern can be formed by, for example, the following methods:

(1) a method in which patterning is carried out directly using a negative black resist;

(2) a method in which a positive resist is patterned, then a black resin layer is formed on the resultant resist pattern and a lift-off process is conducted; and (3) a method in which a black resin composition is printed in the form of a pattern.

In any forming method, the black resin layer 3 is formed with a resin composition incompatible with the resin layer 2 for coloration. When the resin layer 2 for coloration is formed with the above-described silicone resin having the disilane structure, it is therefore preferable to use a solvent, which does not dissolve the silicone resin. For example, when an organopolysilane is used for the resin layer 2 for coloration, a polar solvent such as an alcohol, a glycol, ethyl cellosolve, N-methyl-2-pyrrolidone, γ-butyrolactone or water may preferably be used. Other components than the solvent vary according to the forming method of the black matrices 4. In the case (1) where the negative black resist is used for directly carrying out patterning, a black resin composition comprising components such as a polymeric binder, a photopolymerizable monomer, a polymerization initiator, a colorant and a silane coupling agent is used. However, these respective components may also preferably not dissolve the resin layer 2 for coloration. In the case (2) where the black matrices 4 are formed by a lift-off process, a black resin composition comprising components such as a polymeric binder, a colorant and a silane coupling agent is used. However, these respective components may also preferably not dissolve the resin layer 2 for coloration. In addition, respective components used for the a lift-off process, such as a resist, a developing solution and a stripping solution, may also preferably not dissolve the resin layer 2 for coloration. In the case (3) where the black matrices 4 are formed by printing, a black resin composition comprising components such as a polymeric binder, a colorant, a dispersing agent and a silane coupling agent is used. However, these respective components may also preferably not dissolve the resin layer 2 for coloration.

No particular limitation is imposed on the coating method for the formation of the black resin layer 3, and a coating method such as spin coating, roll coating, bar coating, spray coating or dip coating may be used. Its thickness may be optionally preset so far-as sufficient light-screening ability can be brought about. However, the thickness of the black resin layer 3 is preferably within a range of from 0.5 to 3.0 $\mu$m.

Step (b):

Black matrices 4 is formed by patterning the black resin layer 3. As a patterning method, it is only necessary to conduct exposure and development using a mask when the black resin composition is a resist. This method is preferred because the process is simple. A resist may also be separately formed to conduct patterning by means of etching or the like. In this embodiment, a process in which the black resin layer 3 is formed and then patterned to form the black matrices 4 is illustrated. However, the black matrices 4 may be formed by a lift-off process. A predetermined pattern may also be printed with the black resin composition on the resin layer 2 for coloration to form the black matrices 4. In any event, a black resin composition which neither has compatibility with the underlying resin composition for coloration nor adversely affects such a resin composition layer is used. In the present invention, the black matrices 4 may be either black matrices having an aperture at every pixel or black stripes having a common aperture to a plurality of pixels.

Step (c):

The resin layer 2 for coloration is exposed to light using the black matrices 4 as a mask to develop an ink-accepting property at the exposed areas thereof. Since the areas masked with the black matrices 4 do not develop an ink-accepting property, they will become uncolored portions 6 and prevent an ink to be applied to an exposed area in the next step from penetrating into adjacent exposed areas, whereby color mixing between pixels of different colors can be prevented. Since the black matrices 4 are used as a mask, the apertures defined by the black matrices 4 become colored portions of a color filter as they are. As a result, it is unnecessary to align the black matrices with color filter elements, and occurrence of blank areas in the resulting color filter may also be prevented.

Step (d):

Color inks are applied to the respective exposed areas of the resin layer 2 for coloration by an ink-jet printing apparatus 7 to color the exposed areas. The thus-applied inks and the exposed areas are optionally dried and cured by a heat treatment or the like to form colored portions 8. At this time, the black matrices 4 formed on the resin layer 2 for coloration serve as a wall surrounding each of the exposed areas, whereby the inks applied can be prevented from penetrating into their adjacent exposed areas, and so occurrence of color mixing can be prevented.

As the color inks used in the present invention, may be used either dye-based inks or pigment-based inks. However, their solvent compositions must have sufficient penetrability for the exposed areas of the resin layer 2 for coloration. Taking durability, reliability and the like into consideration, such colorants contained in the inks, such as dyes or pigments, may preferably be fixed into the resin layer 2 for coloration by a heat treatment of the exposed areas. As a method for fixing the colorants, it is effective to three-dimensionally crosslink the exposed areas of the resin layer 2 for coloration so as to take the colorants into the resultant polymeric matrix. For example, poly(phenylmethyl)silane is a linear two-dimensional polymer having a phenyl group and a methyl group at its side chains, and its disilane bonds are severed by exposure to form silanol, thereby developing an ink-accepting property. At this time, the inks are applied to the exposed areas and then heat-treated, whereby the silanol undergoes a condensation reaction by dehydration to form a siloxane polymer. However, the siloxane polymer thus formed is also a linear two-dimensional polymer and so involves a problem of durability, particularly, solvent resistance in subsequent steps. Therefore, in order to improve the solvent resistance, it is effective to form a three-dimensional siloxane polymer as described above. As methods for forming a three-dimensional siloxane bond, the following two methods may preferably be used.

(1) A component capable of forming the three-dimensional crosslinking of silanol, for example, a silicon compound having 3 or 4 alkoxyl or hydroxyl groups, is contained in the color inks in advance.

(2) Silicon atoms each bonded to 3 or 4 silicon atoms are partially introduced into poly(phenylmethyl)-silane in advance.

No particular limitation is imposed on a means for applying the color inks to the exposed areas. However, it is preferable to use an ink-jet printing system that a plurality of colors can be applied by one step. As the ink-jet printing system, a bubble-jet type making use of an electrothermal converter as an energy-generating element or a piezo-jet type making use of a piezoelectric element may be used. The colored area and colored pattern may be optionally preset.

Step (e):

A protective layer 11 is formed as needed. As the protective layer, may be used a resin material of the photo-setting type, thermosetting type or light- and heat-curing type, or an inorganic layer formed by vacuum deposition, sputtering or the like. However, any material may be used so far as it has sufficient transparency to be used in a color filter and withstands subsequent processes, for example, ITO film-forming process and alignment film-forming process in the case where a liquid crystal display device is fabricated. The thickness of the protective layer 11 is preferably within a range of from 0.5 to 3 $\mu$m. Uncolored portions 6 and colored portions 8 constitute a color filter 10.

Figure 2:
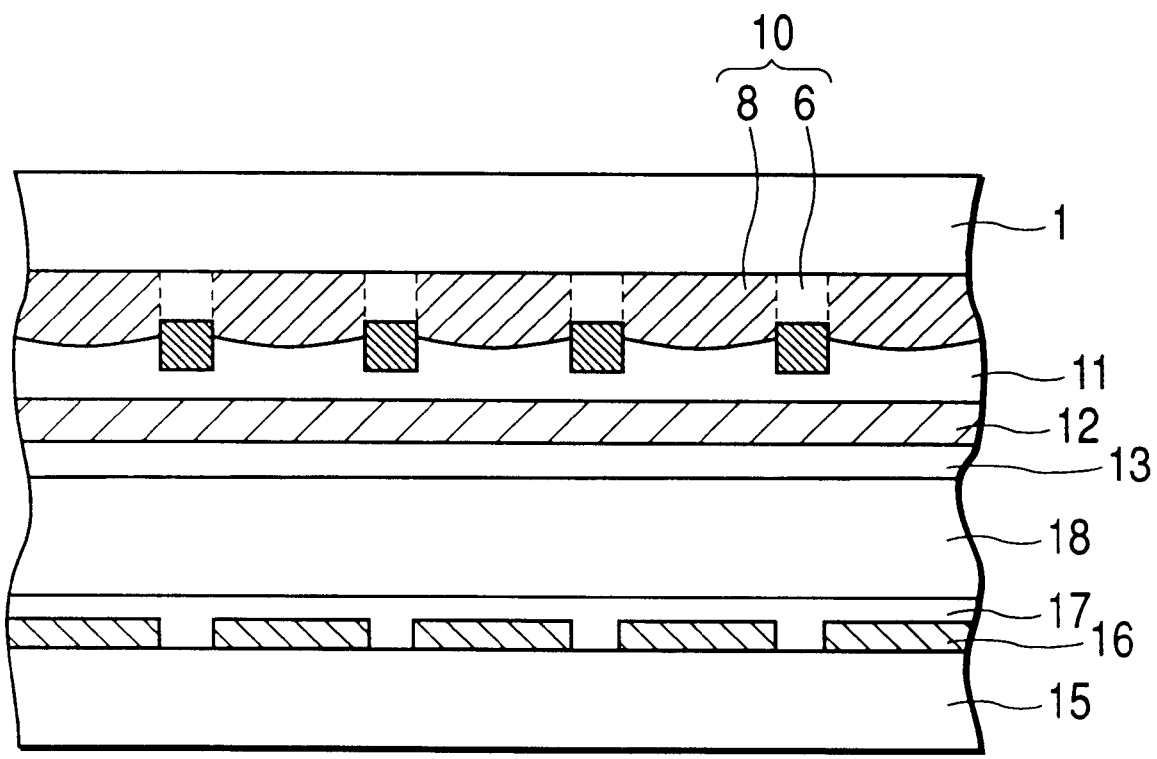
FIG. 2 is a schematic cross-sectional view illustrating an exemplary liquid crystal display device using the color filter substrate produced by the production process according to the present invention.

FIG. 2 is a schematic cross-sectional view illustrating a color liquid crystal display device according to an embodiment of the present invention, which is fabricate by using the color filter substrate produced through the above-described steps. In FIG. 2, reference numeral 12 is a common electrode, 13 is an alignment film, 15 is an opposite substrate, 16 is a pixel electrode, 17 is an alignment film, and 18 is a liquid crystal compound.

The color liquid crystal display device according to this embodiment is of the active matrix type and formed by uniting a substrate 1 on which a color filter 10 has been formed, and the substrate 15 opposite thereto and enclosing the liquid crystal compound 18 in a space between them. On the opposite substrate 15, TFT (not illustrated) and the pixel electrodes 16 are formed in the form of a matrix. On the other substrate 1, colored portions 8 of the color filter 10 are formed at positions corresponding to the individual pixel electrodes 16. The transparent common electrode 12 is formed thereon. The alignment films 13 and 17 are further formed on the respective insides of both substrates. Liquid crystal molecules can be aligned in a fixed direction by subjecting these films to a rubbing treatment.

Further, polarizing plates (not illustrated) are bonded to the outer surfaces of the respective substrates of the liquid crystal display device according to this embodiment. The liquid crystal compound functions as a shutter for changing the transmittance of rays from a back light composed of a combination of a fluorescent lamp and a scattering plate (both, not illustrated), thereby making a display.

With respect to other members than those described in the above embodiment of the present invention, the conventionally known materials and forming methods may be applied as they are.

The present invention will hereinafter be described in more detail by the following Examples. Incidentally, all designations of "part" or "parts" as will be used in the following examples mean part or parts by weight unless expressly noted.

EXAMPLE 1

Poly(phenylmethyl)silane was applied by spin coating onto a glass base, so as to give a coating thickness of 1.2 μm, and prebaked at 90° C. for 20 minutes. A resist for black matrices (V-259, trade name, product of Nippon Steel Chemical Co., Ltd.) was formed so as to give a film thickness of 1.5 μm, and subjected to predetermined exposure, development and heat treatments, thereby forming black matrices having a predetermined pattern on the poly (phenylmethyl)silane layer.

After the poly(phenylmethyl)silane layer was subjected to whole-surface exposure from the side of the black matrices in an exposure value of 3 J/cm$^2$, an ink-jet printing apparatus was used to color the exposed areas of the poly (phenylmethyl)silane layer on a matrix pattern of R, G and B with color inks having the following respective compositions:

| R (Red) ink: | |
|---|---|
| Water | 58 parts |
| Diethylene glycol | 25 parts |
| Methyl alcohol | 10 parts |
| R dye (C.I. Direct Red 80) | 4 parts |
| Methyltrimethoxysilane | 3 parts. |
| G (Green) ink: | |
| Water | 57 parts |
| Diethylene glycol | 25 parts |
| Methyl alcohol | 10 parts |
| G dye (obtained by mixing C.I. Direct Blue 86 and C.I. Acid Yellow 23 at a weight ratio of 7:3) | 5 parts |
| Methyltrimethoxysilane | 3 parts. |
| B (Blue) ink: | |
| Water | 58 parts |
| Diethylene glycol | 25 parts |
| Methyl alcohol | 10 parts |
| B dye (obtained by mixing C.I. Direct Blue 86 and C.I. Acid Red 35 at a weight ratio of 9:1) | 4 parts |
| Methyltrimethoxysilane | 3 parts. |

The inks thus applied were subjected to a heat treatment for 5 minutes at 90° C. and then for 30 minutes at 230° C. A two-pack type thermosetting resin (SS-6500, trade name, product of Japan Synthetic Rubber Co., Ltd.) was further applied to the color filter layer by spin coating, so as to give a film thickness of 1 μm. The thus-formed resin layer was heat-treated at 230° C. for 1 hour to cure it, thereby forming a protective layer.

The color filter substrate thus produced was observed through an optical microscope. As a result, defects such as color mixing, blank areas and color irregularity in pixels were not observed.

EXAMPLE 2

A color filter substrate was produced in the same manner as in Example 1 except that a condensation reaction product of 1,4-bis(chlorosilyl)benzene was used as the resin composition for coloration. The color filter substrate was observed through an optical microscope. As a result, defects such as color mixing, blank areas and color irregularity in pixels were not observed.

EXAMPLE 3

A color filter substrate was produced in the same manner as in Example 1 except that a polysilane synthesized from phenylmethyldichlorosilane and methyltrichlorosilane was used as the resin composition for coloration, and color inks having the following respective compositions were used as the color inks.

| R (Red) ink: | |
|---|---|
| Water | 61 parts |
| Diethylene glycol | 25 parts |
| Methyl alcohol | 10 parts |
| R dye (the same dye as in Example 1) | 4 parts. |
| G (Green) ink: | |
| Water | 60 parts |
| Diethylene glycol | 25 parts |
| Methyl alcohol | 10 parts |
| G dye (the same dye as in Example 1) | 5 parts |
| B (Blue) ink: | |
| Water | 61 parts |
| Diethylene glycol | 25 parts |
| Methyl alcohol | 10 parts |
| B dye (the same dye as in Example 1) | 4 parts. |

The color filter substrate produced in this example was observed through an optical microscope. As a result, defects such as color mixing, blank areas and color irregularity in pixels were not observed.

EXAMPLE 4

A color filter substrate was produced in the same manner as in Example 1 except that black matrices were formed by a lift-off process using a black resin material (HITASOLE, trade name, product of Hitachi Powdered Metals Co., Ltd.) and a positive resist (OFPR-800, trade name, product of Tokyo Ohka Kogyo Co., Ltd.). The color filter substrate was observed through an optical microscope. As a result, defects such as color mixing, blank areas and color irregularity in pixels were not observed.

EXAMPLE 5

A color filter substrate was produced in the same manner as in Example 1 except that black matrices were formed by etching using a polyimide type black resin material and a positive resist (OFPR-800, trade name, product of Tokyo Ohka Kogyo Co., Ltd.). The color filter substrate was observed through an optical microscope. As a result, defects such as color mixing, blank areas and color irregularity in pixels were not observed.

EXAMPLE 6

A color filter substrate was produced in the same manner as in Example 1 except that inks of R, G and B colors having the following composition were used as the color inks.

| Ink composition: | |
| --- | --- |
| Water | 40 to 42 parts |
| Diethylene glycol | 30 parts |
| Methyl alcohol | 10 parts |
| Pigment | 8 to 10 parts |
| Methyltrimethoxysilane | 3 parts |
| Water-soluble acrylic resin | 7 parts. |

Incidentally, an anthraquinone pigment was used as a red pigment, a copper halide phthalocyanine pigment as a green pigment, and a copper phthalocyanine pigment as a blue pigment. The color filter substrate was observed through an optical microscope. As a result, defects such as color mixing, blank areas and color irregularity in pixels were not observed.

According to the present invention, as described above, the colored portions are formed at apertures in a light-screening layer, and so an occurrence of blank areas is prevented in the resulting color filter. In addition, since the areas covered with the light-screening layer become uncolored portions, and the light-screening layer serves as a wall surrounding each of the colored portions, inks in adjacent colored portions are not mixed each other, and so occurrence of color mixing can be prevented. It is unnecessary to separately provide a mask for forming the colored portions, since the light-screening layer is used as a mask. Since it is also unnecessary to align portions of the light-screening layer with color filter elements, the production process can be simplified. In particular, the color inks are applied by an ink-jet printing system, whereby the application of the inks is conducted by one step, and so the process is more shortened. According to the present invention, therefore, color filter substrates having high reliability can be provided with good yield and efficiency, and so liquid crystal display devices having excellent color display characteristics can be provided at a low cost.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing a color filter substrate having a light-screening layer, which comprises the steps of:

forming on a base a resin layer which does not accept ink prior to irradiation with light but which develops an ink-accepting property upon irradiation of light;

forming the light-screening layer as a mask on the resin layer;

exposing the resin layer to light irradiation through the light-screening layer to thereby develop said ink-accepting property only in areas of said resin layer which are not screened by said light screening layer; and applying color inks to the resin layer for coloration, wherein said light screening layer provides a physical barrier between areas of said resin layer having said ink-accepting property.

2. The process according to claim 1, wherein the resin layer for coloration contains a silicone resin having a disilane structure.

3. The process according to claim 1, wherein the light-screening layer is formed by photolithography using a black resin composition.

4. The process according to claim 1, wherein the light-screening layer is formed by a lift-off process using a black resin composition.

5. The process according to claim 1, wherein the light-screening layer is formed by printing using a black resin composition.

6. The process according to claim 1, wherein the color inks each comprise a silicon compound having 3 or 4 alkoxyl or hydroxyl groups.

7. The process according to claim 1, wherein the color inks are applied by an ink-jet printing system.

8. The process according to claim 1, which comprises further a step of forming a protective layer on the colored resin layer for coloration.

9. A liquid crystal display device comprising the color filter substrate produced by the process according to claim 1, an opposite substrate provided in an opposing relation with the color filter substrate, and a liquid crystal enclosed in a space between the color filter substrate and the opposite substrate.

* * * * *